No. 879,869. PATENTED FEB. 25, 1908.
J. HANSEN.
FISH BAIT.
APPLICATION FILED OCT. 28, 1907.

Witnesses
Vernon J. Lilly.
Georgiana Chace

Inventor
Jacob Hansen
By Luther V. Moulton
Attorney

UNITED STATES PATENT OFFICE.

JACOB HANSEN, OF MUSKEGON, MICHIGAN.

FISH-BAIT.

No. 879,869.

Specification of Letters Patent.

Patented Feb. 25, 1908.

Application filed October 28, 1907. Serial No. 399,454.

*To all whom it may concern:*

Be it known that I, JACOB HANSEN, a citizen of the United States of America, residing at Muskegon, in the county of Muskegon and State of Michigan, have invented certain new and useful Improvements in Fish-Bait; and I do hereby declare the following to be a full, clear, and exact description of the invention, such as will enable others skilled in the art to which it appertains to make and use the same.

Figure 1:
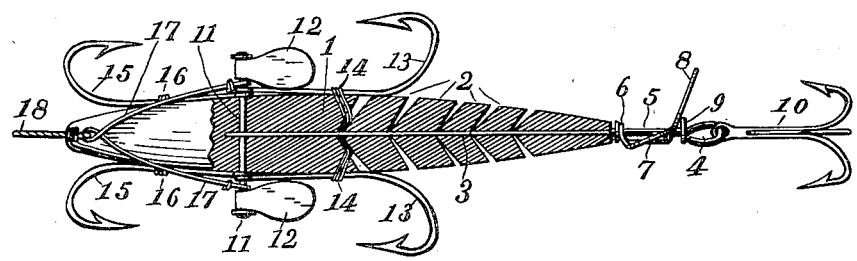
Figure 2:
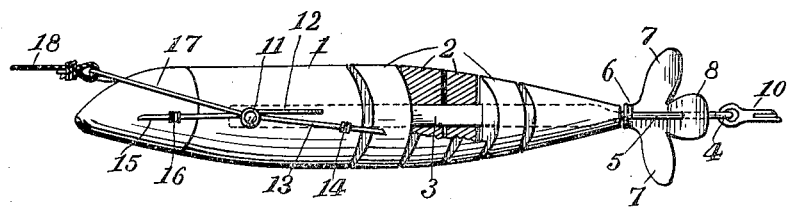

My invention relates to improvements in fish bait and its object is to provide the same with means whereby the rear end of the same may be oscillated in imitation of the swimming movement of a fish, and to provide the same with various new and useful features hereinafter more fully described and particularly pointed out in the claims, reference being had to the accompanying drawings, in which:

Figure 1 is a plan view of the device embodying my invention shown partially in horizontal section; and Fig. 2 a side elevation of the same with portions broken away.

Like numbers refer to like parts in all of the figures.

1 represents the main body of the device preferably formed in imitation of the shape of a small fish, and provided with vertically divided sections 2 throughout its rear portion, said sections being mounted upon a flexible strip 3 whereby the same are flexibly connected to the body 1 and to each other, this strip 3 being preferably a piece of wire flattened in that portion within the body part of the device to render the same laterally flexible, also projecting rearward therefrom and formed into a loop 4 to attach the rear hooks 10 thereto. This rear extension of wire between the body and the loop 4 forms the support or bearing 5 for the rotating tail-piece of the device, which latter is provided with a laterally bent eye 6 journaled on the portion 5 of the wire, and a single rearwardly and laterally inclined flat member 8, also journaled on the wire and oppositely extended spiral portions 7 adapted to rotate the tail-piece on the wire. A pin 11 extends transversely through the body near the front thereof and projects outward at opposite sides of the same. On this pin are pivotally mounted horizontally disposed side fins 12. Hooks 13 are also mounted on this pin and extend rearward therefrom and slightly downward being secured to the body by a fastening 14 extending through the body and engaging the hooks. Forwardly projecting hooks 15 are also mounted on this pin and secured in a parallel plane with the body by a fastening 16 extending through the body and engaging these hooks. To attach this device to a line, a bail 17 is also pivotally mounted on the pin 11 and extends upward and forward therefrom, to which bail is attached the line 18.

In operation, as the device is drawn through the water by the line 18 the tail piece is rotated by the spiral portions 7 in the usual way, and at the same time the single inclined member 8 tends to force the same laterally and being alternately at opposite sides as it is rotated it imparts an oscillating movement from side to side to the flexible rear portion of the body, and when alternately above and below the axis it tends to impart a vertical movement to the rear of the device, whereby the side fins are oscillated on their pivots, thus fairly imitating the swimming movement of a fish.

What I claim is:

1. A fish bait comprising a laterally flexible body, and a rotative tail piece having a single laterally and rearwardly inclined member adapted to oscillate the tail piece.

2. A fish bait comprising a body having vertically divided sections, a laterally flexible strip connecting said sections, and a rotative tail piece having a laterally and rearwardly inclined member.

3. A fish bait comprising a body having a series of vertically divided sections, a wire having a flattened and flexible portion connecting said sections and a rearwardly extended round portion, a tail piece journaled on said extended portion and also having a spiral member and a laterally and rearwardly projecting member.

4. A fish bait comprising a body having a series of vertically divided sections, a wire having a flattened and flexible portion connecting said sections and a rearward extension, a tail piece rotative on said extension, a transverse pin extending through the body and through the said flattened portion of the wire, and side fins pivoted on the ends of said pin.

5. A fish bait comprising a laterally flexible body, and a rotative tail-piece at the rear thereof, said tail piece having a transverse spiral member, and a laterally and rearwardly projecting member.

6. A fish bait comprising a body having vertically divided sections, a flexible strip connecting said sections and extended rearwardly therefrom, a tail piece rotative on said extension and having a laterally and rearwardly projecting member, hooks attached to said extension, a transverse pin extending through the body and projecting at each side thereof, hooks attached to said pin and secured to the body, and a bail pivotally attached to said pin.

7. A fish bait consisting of a flexible body, a rotative tail piece attached thereto and having a spiral member and a laterally and rearwardly projecting member, hooks attached at the rear of the tail piece, a transverse pin oppositely projecting from the body, hooks attached to the pin and secured to the body, and side fins and a bail pivoted on the ends of the pin.

8. A fish bait comprising a flexible body having hooks attached thereto, a rearwardly extended wire attached to the body, and a tail-piece comprising a sheet metal device having a forward and laterally bent eye journaled on the wire, a laterally and rearwardly extended member also journaled on the wire, and oppositely projecting spiral members.

9. A fish bait consisting of a body having a series of vertically divided sections, a flattened wire connecting said sections and having a round rearward extension, a rotative tail piece journaled on said extension and comprising a forward eye a rearward and laterally extended member and spiral members, a transverse pin extending through the body and through the forward part of the flattened wire, side fins and a bail pivoted on said pin, and hooks attached to said body.

In testimony whereof I affix my signature in presence of two witnesses.

JACOB HANSEN.

Witnesses:
P. P. MISNER,
PETER ASMUSSEN.